US006041611A

United States Patent [19]

Palmer

[11] Patent Number: 6,041,611

[45] Date of Patent: Mar. 28, 2000

[54] SYSTEM AND METHOD FOR CLEANING AIR CONDITIONING DRAINS

[76] Inventor: James R. Palmer, 15421 Waywood Ave., Baton Rouge, La. 70816

[21] Appl. No.: 09/137,474

[22] Filed: Aug. 20, 1998

[51] Int. Cl.[7] .............................. F25D 21/14; F16K 3/36

[52] U.S. Cl. .............................. 62/286; 62/285; 137/240

[58] Field of Search .............................. 62/303, 285, 150, 62/286–288; 137/240, 883

[56] References Cited

U.S. PATENT DOCUMENTS

| | | | |
|---|---|---|---|
| 2,031,550 | 2/1936 | Smilack | 62/150 |
| 2,138,611 | 11/1938 | Philipp | 62/150 |
| 2,320,525 | 6/1943 | Kritzer | 62/150 |
| 2,527,308 | 10/1950 | Jackson | 62/150 |
| 4,633,673 | 1/1987 | Morrison et al. | 62/129 |
| 4,998,412 | 3/1991 | Bell | 62/126 |
| 5,085,244 | 2/1992 | Funk | 137/240 |
| 5,651,259 | 7/1997 | Twyman | 62/93 |

*Primary Examiner*—William Doerrler
*Attorney, Agent, or Firm*—Dominique & Waddell, PLC

[57] ABSTRACT

A system for cleaning-out a condensate drain line is disclosed. The condensate drain line is operatively associated with an air-conditioner that contains an evaporator coil and a primary drain pan. The system comprises a manifold operatively placed in fluid communication with the condensate drain line. The manifold includes a first, second, and third line. In one embodiment, the first line extends from the manifold, and the second and third line are axially aligned with the condensate drain line. The system further includes a first valve member disposed within the first line, a second valve member disposed within the second line, and a third valve member disposed within the third line. A water stream, which is operatively connected with the first line, is provided so that the water stream may be channeled through the manifold and into the condensate drain line. The manifold may further comprises a fourth line extending from the center of the manifold, with the fourth line having a fourth valve disposed therein. The system may further comprise sensor means, operatively associated with a secondary pan, for measuring the level of condensation within the secondary pan and activating an alarm once a predetermined level is reached. A method of cleaning a condensate drain line is also disclosed.

15 Claims, 3 Drawing Sheets

SYSTEM AND METHOD FOR CLEANING AIR CONDITIONING DRAINS

BACKGROUND OF THE INVENTION

This invention relates to a system for cleaning a drain line. More particularly, but not by way of limitation, this invention relates to a system and method for cleaning and monitoring a condensate drain line that extends from an air-conditioner and siphoning of the secondary pan.

Air-conditioning has become a standard in homes and businesses throughout the world. Modern homes and businesses come equipped with air-conditioner units, sometimes referred to as central air. In older buildings, owners will install air-conditioner units. Many times, air-conditioner units are installed in the attics of homes for various reasons, including but not limited to, unused space thereby allowing area for other items. The air-conditioner unit is usually placed in an area that is out of sight and out of mind.

In the process of cooling air, the air-conditioner units will produce water which is also referred to as condensation as is well understood by those of ordinary skill in the art. A typical air-conditioner unit contains an evaporator coil which will produce condensation. Therefore, a primary drain pan is generally situated below the evaporator coil in order to collect the water. A condensate drain line is also provided for draining the water. However, the drain pan and/or condensate drain line may become clogged with debris such as sludge for various reasons. When the primary drain pan overflows, the water will spill out to a secondary safety pan. As a result, the safety float switch on the secondary safety pan is opened thereby shutting-off the air conditioning system to prevent water damage. In the case where no safety float switch is installed, spillage will occur. Nevertheless, both situations are undesirable.

Sometimes, in the case of spillage, the water goes unnoticed for days. As will be appreciated, the overflowing water may cause considerable property damage. Also, the water can cause an electrical short. Therefore, the clogging of the drains and drain lines is a considerable problem.

Therefore, there is a need for a system and method that will allow for the cleaning of these type of drain lines. Also, there is a need for an apparatus that can be economically installed that will monitor, purge and clean drain lines.

SUMMARY OF THE INVENTION

A system for cleaning-out a condensate drain line is disclosed. In the preferred embodiment, the condensate drain line is operatively associated with an air-conditioner that contains an evaporator coil, and a primary drain pan. The condensate drain line is fluidly connected to the primary drain pan. The system comprises a manifold operatively placed in fluid communication with the condensate drain line. The manifold includes a first, second, and third line. In one embodiment, the first line extends from the hub (also referred to as the center) of the manifold, and the second and third line are axially aligned with the condensate drain line.

The system further includes a first valve member disposed within the first line, a second valve member disposed within the second line, and a third valve member disposed within the third line. A water supply, which is operatively connected with the first line, is provided so that the water supply may be channeled through the manifold and into the condensate drain line. The manifold may further comprises a fourth line extending from the hub or center of the manifold, with the fourth line having a fourth valve disposed therein.

In one embodiment, the air-conditioner includes a secondary pan positioned below the primary drain pan so as to collect any over flow of condensation from the primary drain pan. The apparatus further comprises a siphon line having a first end and a second end, and wherein the first end is operatively connected to the fourth line of the manifold and the second end is operatively connected to the secondary pan. The system may further comprise a float switch means, operatively associated with the secondary pan, for measuring the level of condensation within the secondary pan and activating an alarm once a predetermined level is reached. Alternatively, the system may include means, operatively associated with the secondary pan, for activating an alarm once a predetermined level of condensation is reached within the secondary pan.

The activating means may include a pan sensor containing a first lead and a second lead that extend into the secondary pan, and a light emitting diode that is connected with the first lead and second lead via the pan sensor. With this activating means, as the condensation level rises and contacts the first lead and the second lead, a complete electrical circuit is formed thereby lighting the light emitting diode.

A method of cleaning a condensate drain line is also disclosed. In one embodiment, the condensate drain line extends from an air-conditioner unit and wherein the air-conditioner unit contains an evaporator coil, a primary drain pan positioned below the air-conditioner unit, and wherein the condensate drain line is fluidly connected to the primary drain pan. The method includes the steps of providing a manifold operatively placed in line with the condensate drain line. In this embodiment, the manifold contains: a first line extending from the hub or center of the manifold; a second line axially aligned with the condensate drain line, with the second line being fluidly connected with the first line; a first valve disposed within the first line; a second valve disposed within the second line; a third line extending from and axially aligned with the second line; a third valve disposed within the third line; a fourth line extending from and axially aligned with the first line; and, a fourth valve disposed within the fourth line.

The method further includes the steps of closing the second valve and the fourth valve, and thereafter, opening the first valve and the third valve. A water stream is provided to the first line. Thereafter, water is flowed through the first line so that the primary drain fine is flushed cleaned. Next, the method includes closing the first and third valve, and then, opening the second valve and first valve flowing the water through the second line so that any debris within the primary drain pan may be flushed. Thereafter, the first valve is closed.

According to the teachings of the present invention, the method then calls for opening the first and second valve for a first predetermined length of time, and thereafter, closing the first valve after expiration of that length of time. Then, the operator may open the third valve for a second predetermined length of time so that the primary drained pan may be drained. The method further comprises closing the first and second valve, and thereafter, opening the third and fourth valve. This will trigger siphoning of the condensation from the secondary pan. The step of siphoning the condensation may further include opening the first valve for a third predetermined length of time; after the expiration of that predetermined length of time, the first valve is closed. Siphoning may continue thereafter. This is done after the main condensate drain line is cleaned.

The operator may choose to flush out the primary drain line again, in which case the method includes closing the fourth valve, opening the first valve and then opening the third valve. The operator may clean-out the primary drain line as long as is necessary. Once the operator feels that the drain lines have been adequately cleaned, the method would entail terminating the flow of water followed by the closing of the first valve. Then, the operator would open the second and third valve, then close the fourth valve. At this point, the air conditioner unit may be returned to normal operation. If a primary drain line vent is needed, the first valve may be opened.

The method may also include monitoring the secondary pan in order to determine when the lines require flushing. Thus, the method would include providing a pan senor means in a secondary pan and allowing condensation to accumulate within the secondary pan. The pan sensor means will be activated once a predetermined level of condensation is reached within the secondary pan. In the preferred embodiment, this will be the activation of a light emitting diode. The operator, once alerted to the situation, may then flush out the drain lines as previously set forth.

Also disclosed is an apparatus for detecting a water height within a primary or secondary pan of an air-conditioner unit. The apparatus includes a circuit means, operatively attached to the pan, for detecting when the water within the pan reaches a predetermined level. The circuit means includes an open switch comprising a first lead and a second lead that are positioned within the pan so that as the condensation level rises and contacts the first lead and the second lead, the open switch is effectively closed.

The circuit means further contains an alarm means for activating an alarm when the open switch closes. In the preferred embodiment, the alarm means includes a light emitting diode operatively associated with the circuit means. The light emitting diode may be remotely located at a location adjacent a thermostat temperature control for the air-conditioner unit.

An advantage of the present system includes the ability to unclog condensate drain lines. Another advantage includes the capability of installing the system in existing air-conditioner units. Yet another advantage is the ability to put together a kit that can be sold for installation with existing air-conditioner units. The novel apparatus cleans the drain, the P-trap, the primary pan and empties the safety pan.

Still yet another advantage is that the system can be sold as a component of a new air-conditioner unit. Yet another advantage is that the system will prevent spillage of condensed water associated with air conditioning. Another advantage is that the method and system herein disclosed will prevent damage to the floors and attics of homes and businesses. Yet another advantage includes the ability to remotely monitor the level of condensation within the secondary pan. When the operator is alerted that condensation has reached a predetermined level within the secondary pan, appropriate action may be undertaken, such as flushing out the drain lines in accordance with the teachings of the present invention. Yet another advantage is that the system gives an early warning as to a potential problem.

A feature of the present invention includes the capability to siphon water that had accumulated within a secondary safety pan. Another feature is the ability to use a standard garden hose with standard residential water pressure with the system herein disclosed. Another feature is that the manifold contains a series of ball valves having an open position or a closed position.

Still yet another feature is that the system and manifold is economical to manufacture and install. Another feature is use of the pan sensor that contains a first and second lead located within the catch pan. As the condensation level in the pan rises to a predetermined level, both leads become submersed thereby completing an electrical circuit that in turn activates a light emitting diode.

DETAILED DESCRIPTION OF THE PREFERRED EMBODIMENTS

Figure 1:
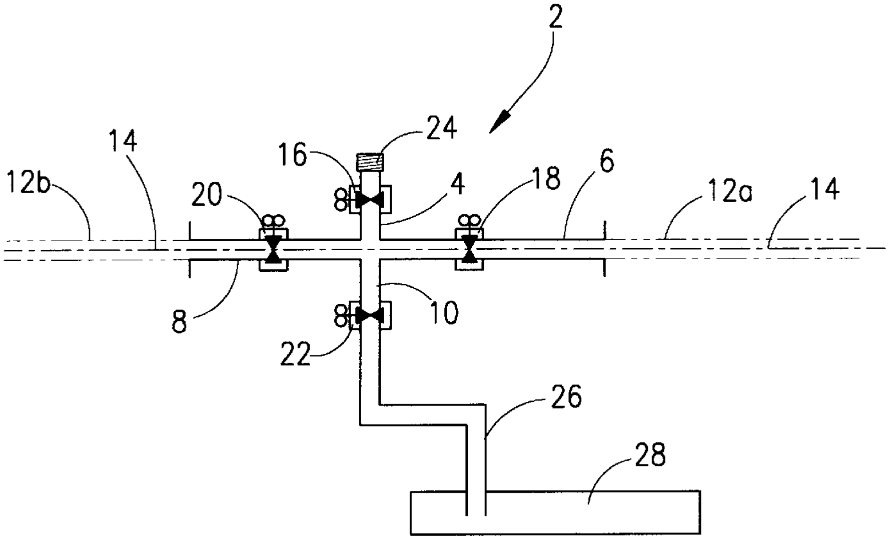
FIG. 1 is a schematic illustration of the apparatus of the present invention.

Referring now to FIG. 1, a schematic illustration of the apparatus 2 of the present invention will now be described. Generally, the apparatus 2 is a manifold 2 that is operatively placed in line with a condensate drain line, with the condensate drain line extending from a drain pan as will be explained later in the application. The manifold comprises a first line 4, a second line 6, a third line 8, and a fourth line 10, with the lines 4, 6, 8, 10 extending from the center of the manifold 2. The condensate drain line is represented by the numeral 12*a* and 12*b*, with the numeral 12*a* being upstream of the manifold 2 and the numeral 12*a* being downstream of the manifold 2.

The axial center plane of the condensate drain line 12*a*, 12*a* is represented by the numeral 14. As shown, the second line 6 and third line 8 are aligned with the axial center plane 14 of the condensate line 12*a*, 12*a*. The first line 4 and the fourth line 10 extend generally perpendicular from the axial center plane 14. The lines 4, 6, 8, 10 may be constructed of any suitable construction material such as PVC pipe, schedule 40.

The first line 4 will have disposed therein a first valve member 16. As depicted, the first It valve member 16 will have an open position and a closed position. In the preferred embodiment, the first valve member is a ball valve 16, with the valve member 16 being commercially available from B & K Industries, Inc. of Illinois under the name Compact Ball Valve, model no. 107-634. A second valve member L8, similar to valve 16, is disposed within the second line 6. A third valve member 20 similar to valve 16, is disposed within the third line 8. Also included is the fourth valve member 22, similar to valve 16, that is disposed within the fourth line 10. The valve members will control flow of fluid through the lines.

As illustrated in FIG. 1, first line 4 will have a hose connection means 24 for connecting a water supply stream to the manifold. In the preferred embodiment, the hose connection means 24 is a standard internal thread means, or any type of quick disconnect, that will allow the operator to hook-up to an external thread means of a standard garden hose (not shown) thereby supplying a water stream to the manifold. Therefore, according to the teachings of the present invention, the water supply is hooked up to the connection means 24, and by various manipulations of the valve means 16, 18, 20 and 22, the condensate drain line 12*a*, 12*a* may be cleaned, as will be more fully explained later in the application.

Also depicted in FIG. 1 is a siphon line 26 that extends from the fourth line 10 into a secondary safety pan 28. Generally, the siphon line 26 will extend into the secondary pan 28 and be positioned about ⅛th of an inch from the bottom of said secondary pan 28. Further, in the preferred embodiment, the siphon line 26 should be attached to a side of the secondary pan 28. The operation of the siphon line 26 will also be explained later in the application.

Figure 2:
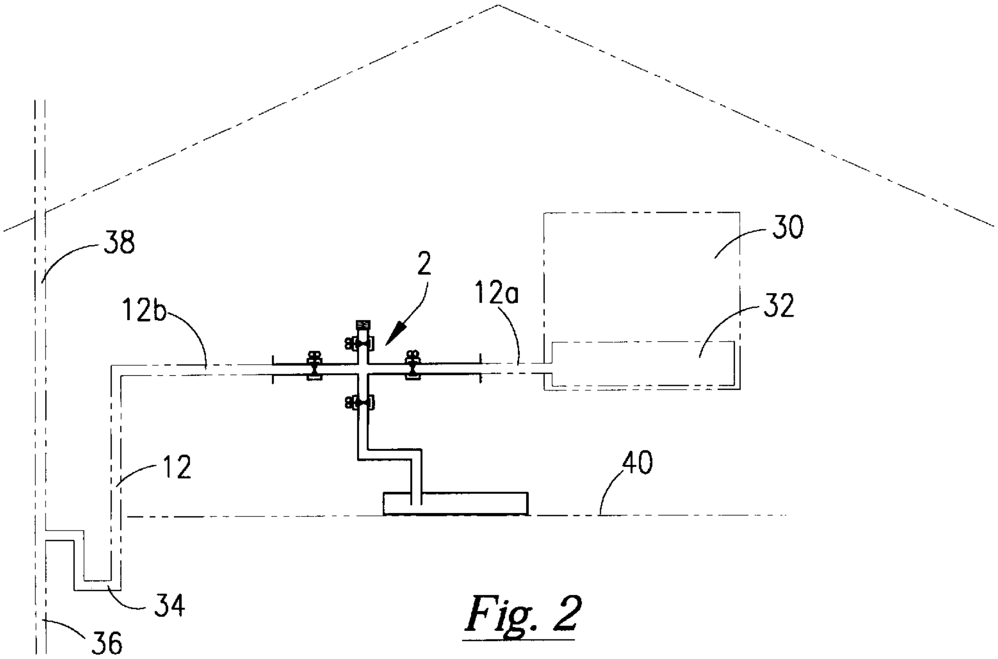
FIG. 2 is a schematic illustration of the apparatus of FIG. 1 installed as part of a drain line of an air-conditioner unit.

Referring now to FIG. 2, a schematic illustration of the apparatus 2 installed in the condensate drain line 12 of an air-conditioner unit will now be explained. It should be noted that like numbers appearing in the various drawings refer to like components. The air-conditioner unit has associated therewith an evaporator coil 30. The air-conditioner is graphically depicted in the attic of a house. Of course, the invention herein described is applicable to all other types of installations.

The evaporator coil 30 is positioned above a primary drain pan 32, as is well understood by those of ordinary skill in the art. As the air-conditioner unit is running, condensation will precipitate from the evaporator coils 30, will fall from the coils 30, and will accumulate in the primary drain pan 32. The condensate drain line 12 will lead from the pan 32. The condensate drain line 12 will lead to a p-trap 34 which in turn extends to the sewer line 36. It should be noted that a sewer vent line 38 is also depicted.

As noted earlier, the condensate drain line 12 may become clogged with debris. When this occurs, the water will back up within the primary drain pan 32. Once the primary drain pan 32 fills, the water will spill over. If the installation contains a secondary safety pan 28, the water will collect into it. However, once the water fills the secondary safety pan 28, the contents will spill over onto the attic floor 40 if an operable safety float switch does not cut the unit off In accordance with the teachings of the present invention, the apparatus 2 is installed into the condensate drain line 12. Once installed, the condensate drain line 12 is separated into sections 12*a* and 12*a* as mentioned earlier. The apparatus 2 may be installed in existing air-conditioner units by cutting a section from the condensate drain line and inserting therein the apparatus 2. The hose may be connected to the hose connection means 24. When the water is turned on, the water supply will be furnished to the manifold 2.

Figure 5:
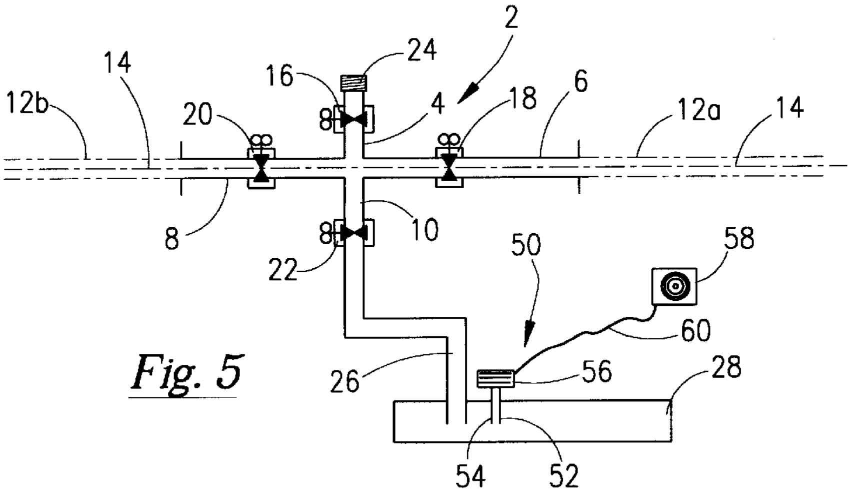
FIG. 5 is a schematic illustration of the apparatus of FIG. 1 that includes a condensate sensor means positioned within the secondary safety pan.

Referring now to FIG. 5, a pan sensor means 50 for activating an alarm once a predetermined level of condensation is reached within the secondary pan 28 will now be described. The pan may be the primary or secondary pan 28. The pan senor means 50 comprises a first lead 52 and a second lead 54 that extend from the pan sensor unit 56 and into the secondary pan 28. The pan sensor unit 56 contains the electrical circuitry means for lighting the light emitting diode 58 that will be described in the discussion of FIG. 6. The electrical circuitry means provides for the first lead 52 and the second lead 54 being in effect an open switch. Once the condensation level in the secondary pan 28 rises to a certain level, the leads 52, 54 will both be in contact with the water and therefore be effectively connected thereby closing the switch and completing the circuit. In turn, the light emitting diode 58 will light. The light emitting diode 58 (LED) may be hard wired 60 to an area such as the central air/heat unit thermostat in the home so that the home owner can view the LED at the same time he views the thermostat. When the LED lights, the home owner knows that he/she must check out the situation and ultimately flush out the lines.

Although not shown, a float switch means, operatively associated with the secondary pan, may alternatively be provided for measuring the level of condensation within the primary 32 and/or secondary pan 28 and activating a shut-off of the air conditioner once a predetermined level is reached within pan 28. With a float switch means, the air conditioner unit will not produce any more condensate since the air conditioner unit is shut-off. The float switch means is commercially available from Beckett Corp. under the model no. 1502.

Figure 6:
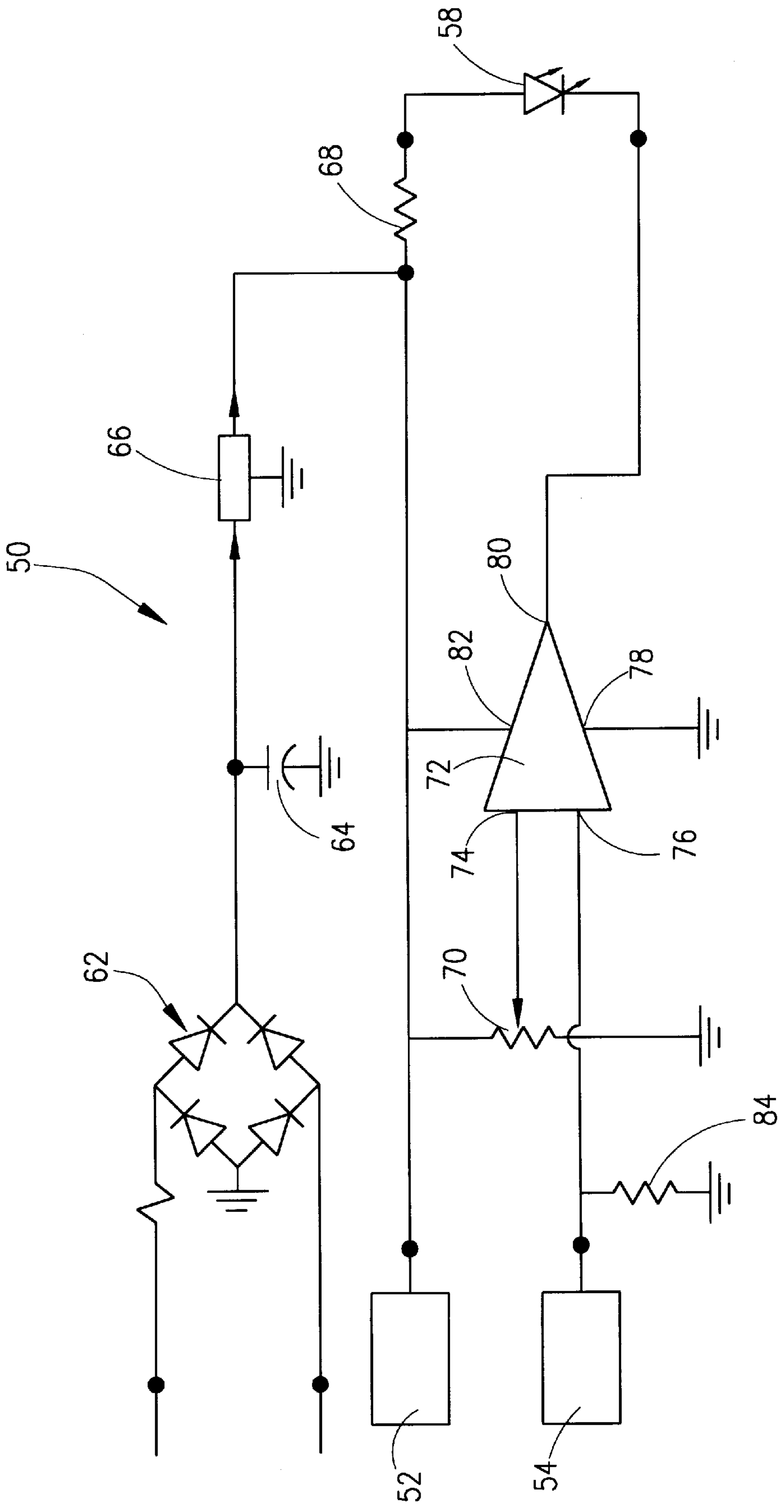
FIG. 6 is an electrical circuit diagram of the condensate sensor means depicted in FIG. 5.

Referring now to FIG. 6, an electrical circuit diagram of the pan sensor 50 is illustrated. The pan sensor 50 will contain the electrical circuitry in order to activate the LED once the leads 52, 54 are submersed in the condensate as previously described. The electrical circuit includes a bridge rectifier 62 that receives an input from a 24 volt alternating current (ac) source. The bridge rectifier 62 and capacitor 64 will convert the ac input voltage to a direct current (dc) voltage. The capacitor 64 may be rated at 35 volt, 1000 uF.

The current is advanced to a 5 volt regulator 66 that maintains a constant 5 volt output. As those of ordinary skill in the art will appreciate, the input voltage may be higher and may vary somewhat. The circuit includes the resistor 68. The resistor 68 serves to lower the voltage for the LED 58. The circuit in turn contains the resistor 70 that is a 1 mega ohm resistor that is set to the sensitivity of when the LED 58 will light. The leads 52, 54 (which are copper in the preferred embodiment) are placed in an area where the operator wishes to detect if any water is present i.e. the secondary pan. The height of the leads 52,54 above the pan bottom will determine the activation height for the LED 58.

The circuit also includes the integrated circuit 72 that contains the input/output pins 74,76.78.80.82. The integrated circuit 72 is commercially available from Technical America Corporation under the model number LM 741. The integrated circuit 72 is configured within the electrical circuit to allow the LED 58 to light when the leads 52, 54 are contacted with the water in the pan. The circuit also contains the resistor 84 which is provided to help prevent false readings. When the leads 52, 54 detect water, the voltage on pin 80 of the integrated circuit 72 will lower thereby causing the LED 58 to light.

As noted earlier and with reference to FIG. 5, the actual LED 58 is placed in a position remote from the pan sensor unit 56. The leads 52,54 may also be positioned remotely from the actual sensor unit 50. Thus, when the water level rises to a predetermined height, the leads 52,54 will come in contact with the water thereby completing the electrical circuit and allowing the LED 58 to light at a remote location. Thus, for instance, the pan may be in an attic, with the pan sensor unit 50 and leads positioned therein while the LED 58 may be next to (or assembled with) the thermostat controls in the house. When the light goes on, the home owner will realize that something is wrong i.e. there is water in the pan. This gives the home owner an early warning before water is actually spilling out over the collection pan. He may investigate, and in turn, flush out the lines in accordance with the teachings of this invention.

Once the apparatus 2 has been installed, whether in a new installation or through adding the apparatus 2 into an existing unit, the method of cleaning out the condensate drain line 12 includes connecting the hose to the connection means 24. Next, the operator would close the second valve 18 and the fourth valve 22. Then, the operator would open the first valve 16 and the third valve 20 and turn the water supply on. The water would flow through the first line 12*a* into the primary drain line and p-trap.

The method would further include closing the first valve 16 and the third valve 20. Next, the operator would open the second valve 18 so that any condensation within the primary drain pan 32 drains out via gravity drain to the valve 20. Thereafter, the operator can open valve 20 to drain pan 32. In order to flush out the primary drain pan 32, the method further comprises closing valve 20 and opening the first valve 16 for a first predetermined length of time. In the preferred embodiment, this duration of time is approximately 3 seconds. Then, the operator immediately closes the first valve 16 after expiration of the first predetermined length of time. Next, the operator opens the third valve 20 for a second predetermined length of time so that said primary drain pan may be drained. In the preferred embodiment, this amount of time is approximately 10 seconds. This step may be repeated as many times as necessary, preferably between two and three times.

Figure 3:
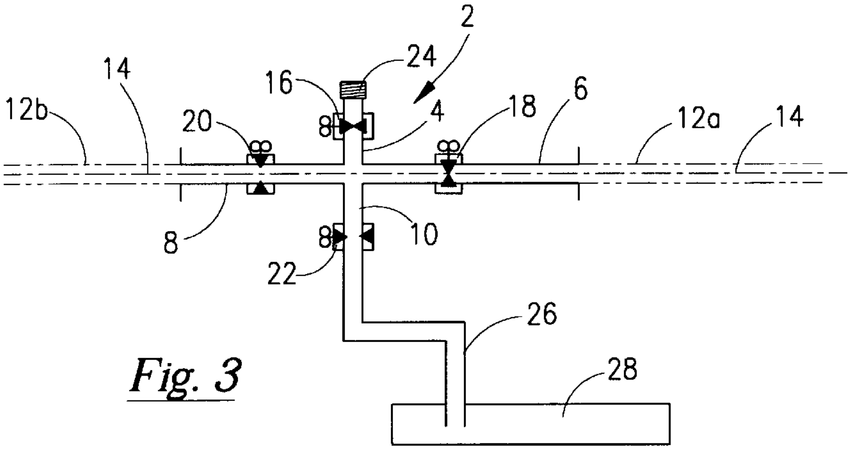
FIG. 3 is a schematic illustration of the apparatus of FIG. 1 with the valves set so as to siphon condensation from the secondary safety pan.

Next, the operator may wish to siphon the water from the secondary pan 28. Thus, the method would include closing the first valve 16 and the second valve 18. Next, the third 20 and fourth valve 22 is opened which will produce a suction within the line 26 so that the condensation within the secondary pan 28 is siphoned. This sequence of valve positions in the manifold is illustrated in FIG. 3. If the operator has a difficult time starting the siphoning, it may be necessary to open the first valve 16 for a third predetermined length of time (preferably 2 seconds) remember, the water is still turned on. This step primes the drain line 12*a*. Next, the operator would close the first valve 16 after expiration of the third predetermined length of time. This should begin the siphoning of the secondary pan 28.

Figure 4:
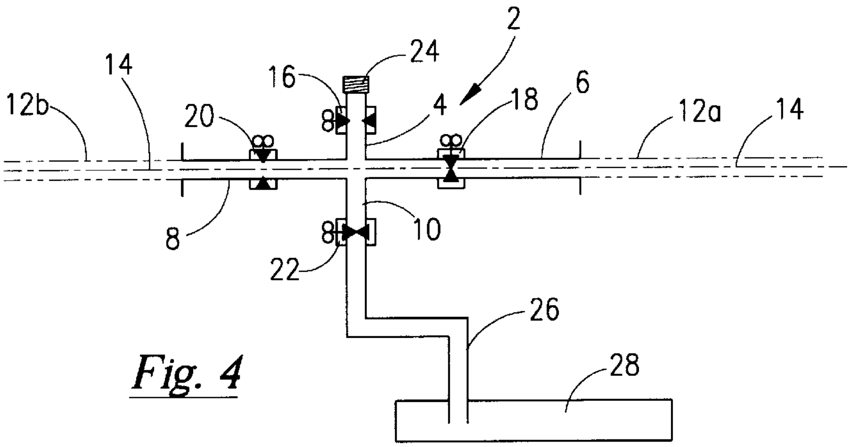
FIG. 4 is a schematic illustration of the apparatus of FIG. 1 with the valves set so as to clean out the condensation drain line.

In an effort to flush and clean the condensate drain line 12*b*, the operator would then close the fourth valve 22 (the second valve 18 is already closed). The operator would then open the first valve 16 and third valve 20. The manifold would be arranged as depicted in FIG. 4. In order to disconnect the manifold from the water supply, the operator would terminate the flow of water by shutting off the water supply, and close the fourth valve 22. The operator would then open the second valve 18 and the third valve 20. If a garden hose was used, the operator would disconnect the hose. A quick disconnect may also be used. If a primary drain line vent is needed, the operator may place the first valve 16 in the open position.

It should be noted that the invention herein disclosed may be installed into a preexisting condensate drain line. The installation of the apparatus 2 would consist of cutting a section from the existing condensate drain line thereby creating the lines 12*a*, 12*a*, and attaching the line 8 and the line 6 with the corresponding condensate drain line 12*a*, 12*a*. The attachment may be performed with conventional means such as using PVC pipe and glueing the apparatus 2 with the existing condensate drain lines 12*a*, 12*b* as will be understood by those of ordinary skill in the art. Further, the siphon line 26 would also have to be cut and fitted to be adapted as shown in FIGS. 1 and 2.

The method may also include monitoring the secondary pan 28 in order to determine when the lines require flushing. Thus, the method would include providing the pan senor means 50 in the secondary pan 28 and allowing condensation to accumulate within the secondary pan 28. Notice that the length of the sensor leads 52,54 will determine the level of condensation within the pan 28 before activation of the LED. The pan sensor means 50 will be activated once this predetermined accumulation level is reached within the secondary pan 28. In the preferred embodiment, this will be the activation of the light emitting diode 58. The operator, once alerted to the situation, may then flush out the drain lines as previously set forth.

Changes and modifications in the specifically described embodiments can be carried out without departing from the scope of the invention which is intended to be limited only by the scope of the appended claims.

I claim:

1. An apparatus for cleaning a condensate drain line having an axial center plane, with said condensate drain line being connected to an air-conditioner, said air-conditioner containing an evaporator coil, and primary drain pan positioned below said air-conditioner, and wherein said condensate drain line is fluidly connected to said primary drain pan, and wherein the apparatus is associated with a water supply, the apparatus comprising:

a first line having disposed therein a first valve member, said first valve member having an open position and a closed position;

a second line axially aligned with the axial center plane of said condensate drain line, and wherein said second line has disposed therein a second valve member, said second valve member having an open position and closed position;

a water supply connection member operatively attached to said first line so that the water supply may be channeled through said first valve member and into said condensate drain line;

a third line axially aligned with the axial center plane of said condensate drain line and being downstream of said second valve member, and wherein said third line has disposed therein a third valve member, said third valve member having an open position and as closed position;

fourth line extending form said first line, and wherein said forth line has disposed therein a fourth valve member, said fourth valve member having an open position and closed position.

2. The apparatus of claim 1 wherein said air-conditioner includes a secondary pan positioned below said primary drain pan so as to collect over flow condensation from said primary drain pan, and the apparatus further comprising:

a siphon line having a first end and a second end, and wherein said first end is operatively connected to said fourth line and the second end is operatively connected to said secondary pan;

a pan sensor means, operatively positioned within said secondary pan, for activating an alarm once a predetermined level of condensation is reached within said secondary pan.

3. The apparatus of claim 2 wherein said pan sensor means comprises:

an electrical circuit means containing an open switch, wherein said open switch includes: a first lead and a second lead that extend into said secondary pan; and, a light emitting diode operatively connected with said electrical circuit means so that as the condensation level contacts said first lead and said second lead, said first lead and said second lead form a closed switch so that said electrical circuit means is closed allowing said light emitting diode to activate.

4. A system for flushing out a condensate drain line, said condensate drain line being connected to an air-conditioner and wherein said air-conditioner contains an evaporator coil, and a primary drain pan positioned below said air-conditioner, and wherein said condensate drain line has an axial center plane and is fluidly connected to said primary drain pan, the system comprising:

a manifold containing: a first line; a second line axially aligned with said condensate drain line's axial center plane, said second line being fluidly connected with said first line; a third line axially aligned with said axial center plane of said condensate drain line and said second line; and, a fourth line extending from the center of said manifold;

a first valve member disposed within said first line;

a second valve member disposed within said second line;

a third valve member disposed within said second line;

a fourth valve member disposed within said second line;

a water supply operatively connected with said first line so that said water supply may be channeled through said manifold and into said condensate drain line.

5. The system of claim 3 wherein said air-conditioner includes a secondary pan positioned below said primary drain pan so as to collect over flow condensation from said primary drain pan, and the apparatus further comprising:

a siphon line having a first end and a second end, and wherein said first end is operatively connected to said fourth line and the second end is operatively connected to said secondary pan.

6. The system of claim 5 further comprising:

means, operatively associated with said secondary pan, for activating an alarm once a predetermined level of condensation is reached within said secondary pan.

7. The system of claim 6 wherein said activating means includes a pan sensor containing a first lead and a second lead that extend into said secondary pan, and a light emitting diode connected with said pan sensor so that as the condensation level contacts said first lead and said second lead, a complete electrical circuit is formed thereby lighting said light emitting diode.

8. A method of cleaning a tubular drain line extending from an air-conditioner and wherein said air-conditioner contains an evapator coil, a primary drain pan positioned below said air-conditioner to collect a condensation, and wherein said tubular drain line is fluidly connected to said primary drain pan, the method comprising:

providing a manifold operatively placed within said tubular drain line, said manifold comprising: a first line extending from a hub of said manifold; a first valve disposed within said first line; a second line axially aligned with an axial center of said tubular drain line; a second valve disposed within said second line; a third line extending from said second line, said third line being axially aligned with said second line; a third valve disposed within said third line; a fourth line extending from said first line, said fourth line being axially aligned with said first line; a fourth valve disposed within said fourth line; and wherein the method comprises:

placing said second valve and said fourth valve in a closed position;

placing said first valve and said third valve in an open position;

providing a water stream to said first line;

flowing the water stream through said first line;

flushing the primary drain line by flowing the water through said third valve.

9. The method of claim 8 further comprising:

closing said third valve;

opening said second valve;

flowing the water stream through the second line so that any debris within said primary drain pan may be flushed;

closing said first valve.

10. The method of claim 9 further comprising:

opening said first valve for a first predetermined length of time;

closing said first valve after expiration of said first predetermined length of time;

opening said third valve for a second predetermined length of time so that said primary drain pan may be drained.

11. The method of claim 10 further comprising:

maintaining said first valve in a closed position;

closing said second valve;

opening said third valve;

opening said fourth valve;

siphoning the condensation from said secondary pan.

12. The method of claim 11 wherein the step of siphoning the condensation further includes:

opening said first valve for a third predetermined length of time;

closing said first valve after expiration of said third predetermined length of time.

13. The method of claim 12 further comprising:

closing said fourth valve;

opening said first valve;

opening said third valve so that any debris trapped in the condensate drain after siphoning can be flushed out.

14. The method of claim 13 further comprising:

terminating the flow of water maintaining said fourth valve in the closed position;

opening said second valve;

maintaining said third valve in the opened position.

15. The method of claim 14 further comprising:

opening said second valve and said fourth valve;

closing said first valve and said third valve;

providing a pan senor means in a secondary pan;

allowing condensation to accumulate within said secondary pan;

activating said pan sensor means once a predetermined level of condensation is reached within said secondary pan;

placing said second valve and said fourth valve in a closed position;

placing said first valve and said third valve in an open position;

supplying the water stream to said first line;

flowing the water stream through said first line;

flushing the primary drain line by flowing the water through said third valve.

* * * * *